United States Patent

[11] 3,591,256

| [72] | Inventors | August Hoyer<br>Penfield;<br>Karl E. Liechty, Pittsford; Richard T. Ziehm, Webster, all of, N.Y. |
|---|---|---|
| [21] | Appl. No. | 721,333 |
| [22] | Filed | Apr. 15, 1968 |
| [45] | Patented | July 6, 1971 |
| [73] | Assignee | Xerox Corporation<br>Rochester, N.Y. |

[54] VARIABLE MAGNIFICATION LENS SYSTEM
6 Claims, 5 Drawing Figs.

[52] U.S. Cl. ........................................... 350/183,
350/187, 350/206
[51] Int. Cl. ................................................ G02b 15/10
[50] Field of Search ............................. 74/222,
89.22, 89.2; 318/468, 266; 95/45; 350/247,
183—187, 40, 37—39, 241, 289

[56] References Cited
UNITED STATES PATENTS

| 1,879,737 | 9/1932 | Del Riccio | 350/38 UX |
| 3,267,828 | 8/1966 | Raab | 350/187 |
| 3,392,488 | 7/1968 | Werner | 74/89.2 X |
| 1,991,530 | 2/1935 | Walker | 350/187 X |
| FOREIGN PATENTS | | | |
| 685,945 | 1/1953 | Great Britain | 350/187 |
| 1,066,502 | 4/1967 | Great Britain | 350/187 |

*Primary Examiner*—David H. Rubin
*Attorneys*—Norman E. Schrader, James J. Ralabate and Ronald Zibelli

ABSTRACT: Lens system including a first lens supported by a movable carriage for displacement along the system optical path to vary the size of the image projected by the first lens, a second lens rotatably supported on the carriage, link means for moving the second lens into the optical path on displacement of the carriage and the first lens to restore first lens focus, stopping means engageably with the lens carriage to limit carriage movement; and normally operative drive means for displacing the carriage, the stopping means and normally operative drive means cooperating to prevent unwarranted movement of the first and second lenses.

INVENTORS.
AUGUST HOYER
KARL E. LIECHTY
BY RICHARD T. ZIEHM

ATTORNEYS

INVENTORS.
AUGUST HOYER
KARL E. LIECHTY
BY RICHARD T. ZIEHM

ATTORNEYS

VARIABLE MAGNIFICATION LENS SYSTEM

This invention relates to a lens system and, more particularly, to a system for displacing lenses in an optical environment to change image size.

In optical systems such as those employed with photocopying or document reproducing machines, it is often desirable to vary the size of the image projected by the optical system, for example, to provide reduced size copy. Changes in the size of the image projected by the optical system may be effected by moving the lens along the system optical path. However, when the lens is a fixed focus lens, any movement of the lens from the point of inherent focus of that lens blurs the projected image. To restore image clarity either a corrective lens must be added or an accommodating change in the optical system conjugate distance must be made.

Adjusting the system conjugate distance to restore image clarity following lens displacement is not always preferred because of the difficulty in maintaining component parts of the optical system, such as mirrors, in the required relative positions. On the other hand, adding a corrective lens means that two lenses instead of one must be precisely located relative to one another and to the system optical path to assure a clear cut image. In addition to the problems entailed in moving and positioning one or two lenses, it is essential that the lenses, when positioned, remain stationary and unaffected by jarring or vibration.

It is a principal object of the present invention to provide a new and improved variable magnification lens system.

It is a further object of the present invention to provide an improved mechanism for changing the relative locations of lenses in an optical system to change image size.

It is a further object of the present invention to provide, in an optical system having relatively movable lenses, normally operative drive means for changing the relative positions of the lenses with stopping means cooperating with the drive means to prevent unwarranted displacement of the lenses.

This invention relates to an optical system comprising in combination, fixed focus first lens means, the first lens means being movable to vary the size of the image projected by the first lens means, the first lens means being adapted in a first position to focus an image of preset size; second lens means movable into operative association with the first lens means on movement of the first lens means to a second position, the second lens means cooperating with the first lens means to focus a different size image; normally operative driving means for moving both the first and second lens means; and stopping means disposed in the path of movement of the first and second lens means and engageable with the first and second lens means following movement of the first lens means to the second position to stop movement of the first and second lens means in opposition to the sustained drive of the driving means whereby the driving means and stopping means cooperate to maintain the first and second lens means stationary.

Other objects and advantages will be apparent from the ensuing description and drawings in which.

Figure 1:
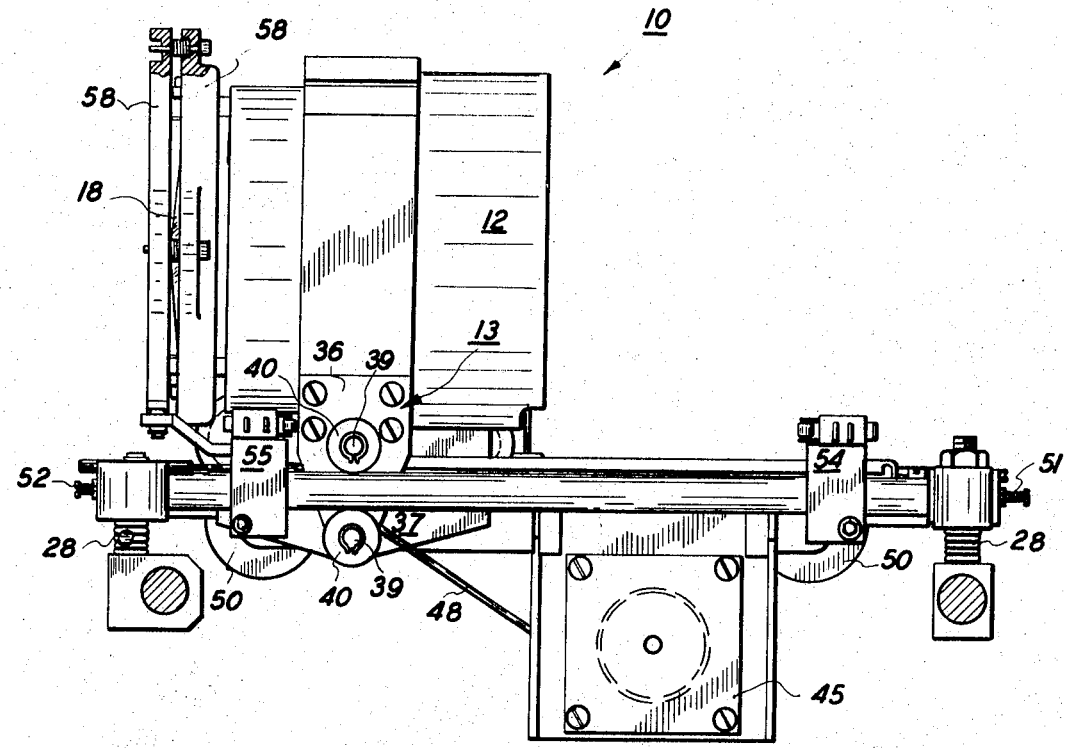
FIG. 1 is a side view showing the lens system of the present invention.

Referring to FIGS. 1—4 of the drawings, there is shown the lens system, designated generally by the numeral 10, of the present invention. As will appear more fully, lens system 10 enables the image generated thereby to be enlarged or reduced. Lens systems of this type may be used, for example, with document copying or reproducing machines where it is often desirable to provide an enlarged or reduced image copy. While lens system 10 is intended for use in optical systems where the conjugate distance is fixed, it will be understood that the system 10 may be employed in systems having variable conjugate distances.

In the exemplary embodiment shown, a fixed focus lens 12 is supported on movable carriage 13. Carriage 13 moves back and forth longitudinally along the system optical path between limit stops 51, 52 to change size of the image projected by lens 12.

Lens 12 is chosen to focus an image of predetermined size on a suitable image plane (not shown) when carriage 13 abuts stop 51. To change image size, carriage 13 is displaced longitudinally along the optical path from stop 51 to stop 52. It is understood that if a corresponding change in the conjugate distance of the optical system is not made, displacement of carriage 13 from stop 51 to stop 52 blurs the image projected by lens 12. In the present arrangement, a second or add-on lens 18 is automatically inserted in the system optical path on movement of carriage 13 from stop 51 to stop 52, lenses 12, 18 cooperating to focus a different size image on the image plane (not shown).

In certain applications, as for example where lens system 10 is used with a document reproduction or photocopying machine, (not shown), it may be desirable to change the amount of transmitted light in accordance with the change in image size. To correlate the amount of transmitted light with the size of the projected image, lens system 10 includes means effective with displacement of carriage 13 between limit stops 51, 52 to vary the aperture setting of lens 12.

Referring particularly to FIGS. 1—4 of the drawings, lens system 10 includes a generally I-shaped frame 22 having center web 23 with opposed ends 24, 25. Frame 22 is resiliently supported on a suitable base (not shown) by means of springs 28.

A pair of spaced, parallel rodlike tracks 30 are supported between ends 24, 25 of frame 22. As will appear more fully hereinafter, tracks 30 support lens carriage 13 for longitudinal movement between limit stops 51, 52.

Lens carriage 13 comprises an elongated generally rectangular housing 34 having depending sidewalls 36, 37. Lens 12 is suitably encased within housing 34 in a manner known to those skilled in the art. Wall 36, the depending portion of which is relatively narrow, has a pair of spaced vertically aligned, roller journaling shafts 39 projecting outwardly therefrom. A roller 40 is rotatably mounted on each shaft 39.

Sidewall 37, the depending portion of which is relatively wide, has a pair of spaced vertically aligned roller journaling shafts 41, 42 projecting outwardly therefrom adjacent the front and rear edges thereof. Rollers 44 are rotatably supported by shafts 41, 42. To prevent sideways movement of lens carriage 13, the peripheral surface of the upper rollers is grooved at 44'. Rollers 40, 44 ride on the upper and lower surface of tracks 30 to support lens carriage 13 for longitudinal movement therealong. As can be understood, the grooved roller portions 44' prevent sideways movement of carriage 13 on rodlike tracks 30.

Drive motor 45 may be conveniently disposed underneath frame 22. A drive pulley 46 is secured to shaft 47 of motor 45. Driving cable 48 is suitably arranged on drive pulley 46 in frictional driving engagement therewith. The terminal ends of cable 48 are connected to opposite edges of wall 37 of lens carriage 13. Guide pulleys 50 are provided on center web 23 and on frame ends 24, 25 to support and route cable 48.

Limit stops 51, 52 are supported on ends 24, 25, respectively, of frame 22 in the path of movement of lens carriage sidewall 37. Stops 51, 52 engage opposite edges of wall 37 to limit longitudinal travel of carriage 13 along tracks 30. Stops 50, 51 are preferably longitudinally adjustable to enable movement of carriage 13 to be controlled.

Stop switches 54, 55 with attendant circuitry (not shown) may be provided to render the machine associated with lens system 10 such as a copying machine, inoperative while lens carriage 13 is moving between limit stops 51, 52. Switches 54, 55 are disposed on tracks 30 in the path of movement of wall 36 of lens carriage 13. Actuation of either switch 54 or 55 by engagement therewith of the adjoining edge of sidewall 36 permits operation of the machine associated with lens system 10.

Sidewall 37 of lens carriage 13 has a pair of spaced hinge brackets 57 projecting outwardly therefrom. Housing 58 of add-on lens 18 is pivotally attached at one end thereof to brackets 57 by hinge pin 59.

A link 60 is disposed between the opposite end of add-on lens housing 58 and center web 23 of frame 22, link 60 being pivotally secured to housing 58 and frame 22 by pins 62, 63, respectively. To permit adjustment of the pivot connection of link 60 with frame 22, pin 63 is disposed in slotlike receptacle 64 in center web 23. Adjustable positioning means 66 is provided to retain pin 63 in selected longitudinal position in receptacle 64.

On longitudinal movement of lens carriage 13 along tracks 30, hinge pin 59, which secures add-on lens housing 58 to carriage 13, undergoes concurrent longitudinal displacement. Inasmuch as pin 63, which secures link 60 to base 22 is fixed, movement of carriage 13 pivots add-on lens housing 58 about pin 59. Where lens carriage 13 moves from stop 51 to stop 52 (shown by the solid line arrow of FIG. 2), lens housing 58 pivots in a counterclockwise direction about pin 59 and add-on lens 18 moves in front of lens 12 and into the system optical path as lens carriage 13 moves into engagement with stop 52. On movement of carriage 13 in the opposite direction from stop 52 to stop 51, (shown by the dotted line arrow in FIG. 2), lens housing 58 pivots in a clockwise direction about pin 59 moving add-on lens 18 out of the system optical path as carriage 13 reaches limit stop 51. Link 60 is sized relative to the distance between limit stop 51, 52 so that on abutment of carriage 13 with limit stop 51, add-on lens 18 is totally removed from the field of vision of lens 12.

Figure 4:
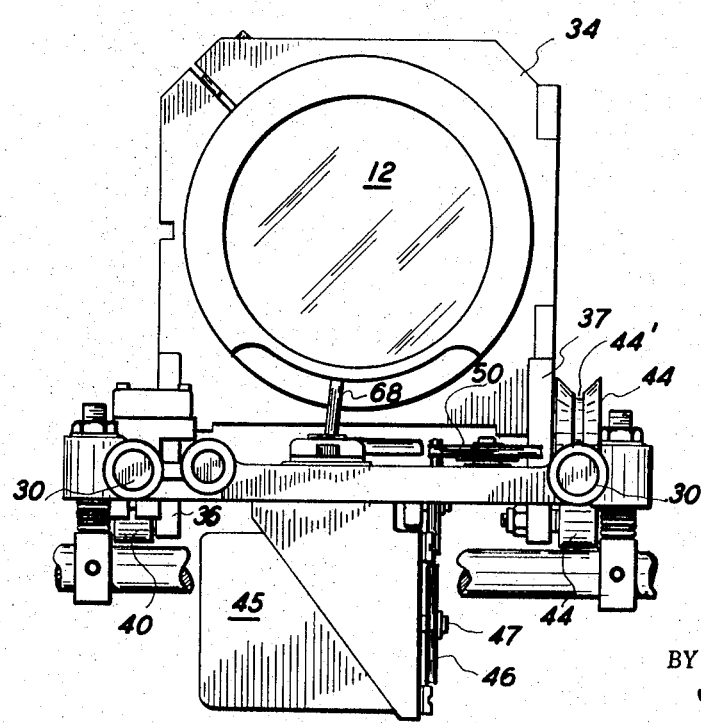
FIG. 4 is a rear view showing the aperture control for the principle lens.
Figures 2, 3, 5:
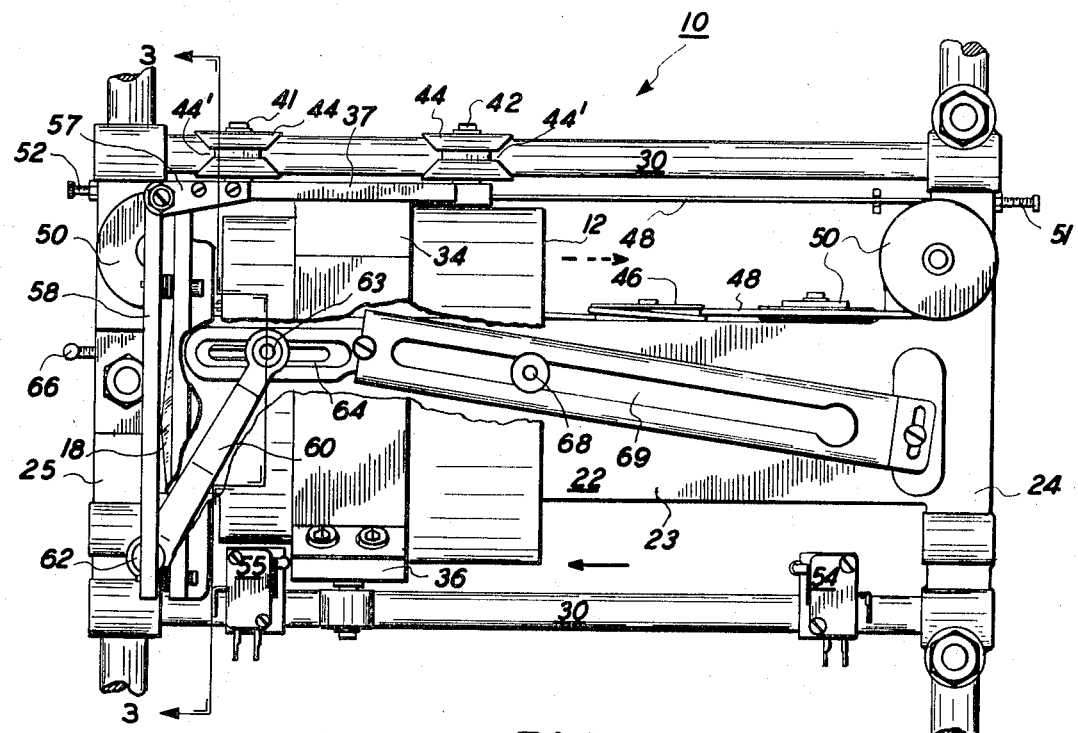
FIG. 2 is a top plan view of the lens system shown in FIG. 1.
FIG. 3 is a rear view taken along the line 3—3 of FIG. 2 showing the add-on lens driving means.
FIG. 5 is a circuit diagram of the control arrangement for the lens system of the present invention.

Lens 12 incorporates conventional means (not shown) for adjusting the lens aperture, there being provided rodlike control element 68 for this purpose. As will be understood by those skilled in the art, element 68 when moved radially back and forth, varies the aperture setting of lens 12. As best seen in FIGS. 2 and 4 of the drawings, housing 34 of lens 12 is supported so that the control element 68 extends downwardly into camming slot 68 in center web 23 of frame 22. Slot 69, which extends at a predetermined angle to the direction of longitudinal movement of lens carriage, coacts with control element 68 to vary the aperture setting of lens 12 with movement of carriage 13.

Referring to FIG. 5 of the drawings, motor 45 which comprises any suitable reversible motor such as a shaded pole motor, has field winding 72 connected through on-off switch 75 to a suitable source of electrical energy, represented by leads $L_1$, $L_2$. A pair of control windings 70, 71 are provided, switches 73, 74 thereof serving on closure to short the winding 70, 71 respectively, associated therewith to cause motor 45 to rotate in either a forward or reverse direction on energization of field winding 72 in a manner known to those skilled in the art. Switches 73, 74 are preferably arranged for joint operation such that closure of one switch opens the other, and vice versa. Inasmuch as switch 75 is normally closed, motor 75 is continuously operated in either the forward or reverse direction depending upon the condition of switches 73, 74. Since the abutment of carriage 13 with stop 51 or 52 prevents further movement of carriage 13, motor 45 stalls, the stall torque developed by motor 45 serving to maintain carriage 13 tightly against one or the other of the limit stops 51 or 52 until switch 73 or 74 is actuated to reverse motor 45. The continuing force exerted by motor 45 on carriage 13 maintains carriage 13, and lenses 12, 18, stationary following abutment of carriage 13 with stop 51 or 52 thereby assuring optical system accuracy and obviating the effects of subsequent extraneous forces such as vibration, tending to displace lenses 12, 18.

With on-off switch 75 closed and assuming control switch 74 closed, lens carriage 13 abuts stop 51. Add-on lens 18 is accordingly disposed along sidewall 37 of lens housing 34 out of the field of view of lens 12. Lens 12 focuses an image on the image plane (not shown), the image size depending upon the inherent magnification properties of lens 12. With switch 74 closed, control winding 70 of motor 45 is shorted and the stall torque developed by motor 45 holds carriage 13 tightly against limit stop 51. Abutment of sidewall 36 with switch 55 holds switch 55 actuated enabling the machine associated with lens system 10 to be operated.

To change the size of the projected image, control switch 73 is closed to short control winding 71 of motor 45. At the same time, control switch 74 is opened. Motor 45 is therefore reversed to move, by means of pulley 46 and cable 48, lens carriage 13 along tracks 30 toward stop 52. As carriage 13 starts toward stop 52, switch 55 disables the machine with which lens system 10 is associated.

As lens carriage 13 moves toward limit stop 52, lens housing 58 pivots about hinge pin 59 carrying add-on lens 18 into the system optical path. Abutment of sidewall 37 of carriage 13 with limit stop 52 stops carriage 13 and lenses 12, 18 with add-on lens 18 disposed in the system optical path in front of lens 12. As carriage 13 abuts stop 52, wall 36 thereof engages switch 54 to ready the machine with which lens drive apparatus 10 is associated for operation.

Movement of lens carriage 13 from stop 51 to stop 52 causes concurrent displacement of aperture control element 68 in slot 69. Due to the angular relationship of slot 69 to the direction of carriage movement, control element 68 moves radially to change the aperture setting of lens 12 and adjust the amount of light transmitted by lens 12 in accordance with the change in image size.

As described heretofore, motor 45 remains energized through switches 73, 75 to retain carriage 13 against stop 52 to prevent unwarranted movement of lenses 12, 18.

It is understood that subsequent closure of control switch 74 and opening of switch 73 reverses motor 45 to move lens carriage 13 from limit stop 52 to stop 51. As carriage 13 moves toward stop 51, add-on lens 18 moves out of the system optical path to a position alongside lens housing 34 as described heretofore.

While we have described and illustrated a preferred form of our invention, it will be apparent to those skilled in the art that changes and modifications may be made thereto without departing from the spirit and intent of the invention which is limited only by the scope of the appended claims.

What we claim is:

1. In an optical system, the combination of fixed focus first lens means, said first lens means being movable to vary the size of the image projected by said first lens means, said first lens means being adapted in a first position to focus an image of preset size; second lens means movable into operative association with said first lens means on movement of said first lens means to a second position, said second lens means cooperating with said first lens means to focus a different size image; normally continuously operated driving means for moving both said first and second lens means; and stopping means disposed in the path of movement of said first and second lens means and engageable with said first and second lens means following movement of said first lens means to said second position to stop movement of said first and second lens means in opposition to the sustained drive of said continuously operated driving means whereby said driving means and said stopping means cooperate to maintain said first and second lens means stationary.

2. The system according to claim 1 in which said driving means comprises a reversible motor adapted when reversed to return said first lens means to said first position while withdrawing said second lens means from operative association with said first lens means; and second stopping means disposed in the path of return movement of said first lens means and engageable with said first lens means following return of said first lens means to said first position to prevent further movement of said first lens means in opposition to the sustained reversed drive of said continuously operated driving means whereby said driving means and said second stopping means cooperate to maintain said first lens means stationary.

3. The system according to claim 2 including a frame; movable lens carriage means for said first lens means on said frame, said carriage means supporting said first lens means for back and forth movement along the system optical path between said first and second stopping means;

hinge means pivotally supporting said second lens means on said carriage means whereby said second lens means may pivot into and out of said system optical path; and link means connecting said second lens means with said frame whereby on movement of said carriage means in the direction of said first stopping means, said link means pivots said second lens means into said optical path and cooperative relationship with said first lens means while on movement of said carriage means in the direction of said second stopping means, said link means pivots said second lens means out of said optical path.

4. The system according to claim 3 in which said second lens means includes an elongated housing, said hinge means being adjacent one end of said housing, said link means being connected adjacent the opposite end of said housing.

5. The system according to claim 1 in which said first lens means includes a movable aperture control element, and means for moving said control element to vary the aperture setting of said first lens means in response to movement of said first lens means.

6. The system according to claim 5 in which said control element moving means includes stationary camming means engageable with said control element and operative upon movement of said first lens means to move said control element and change the aperture setting of said first lens means.